N. W. KNIGHT.
COMBINED PARACHUTE AND HELICOPTER.
APPLICATION FILED JUNE 21, 1911.
1,021,784.
Patented Apr. 2, 1912.
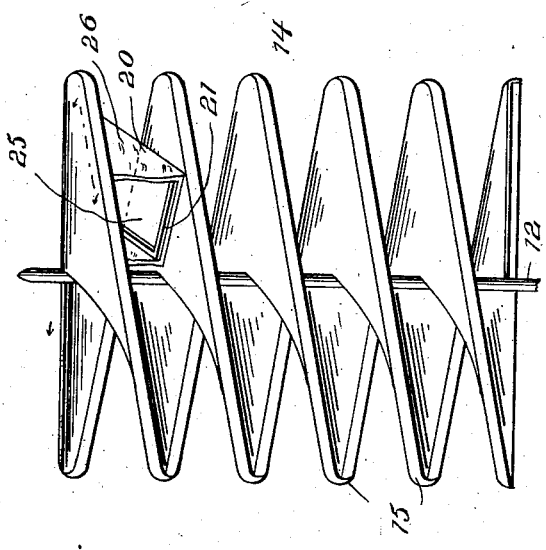
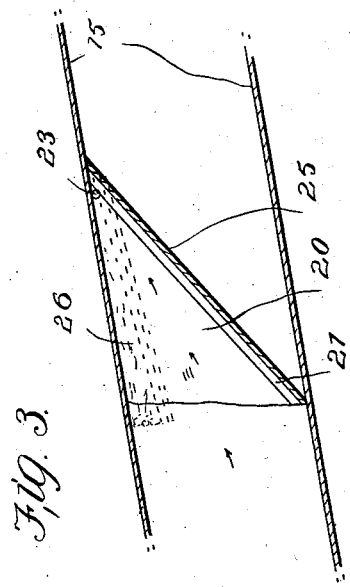
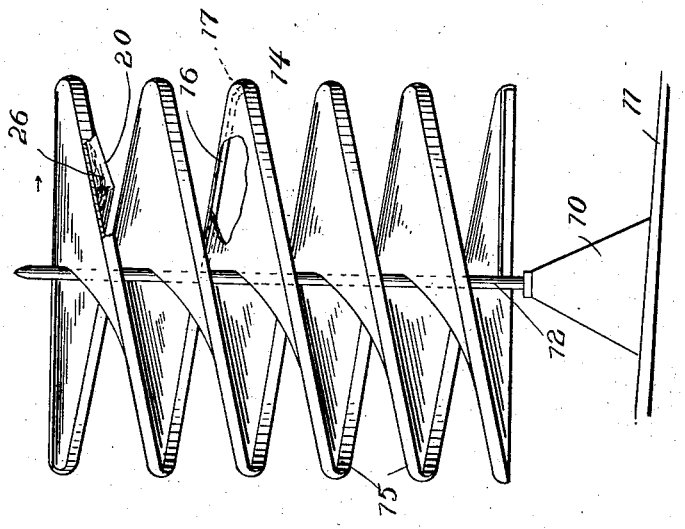
Witnesses
William Smith
Chr. R. Nelsen
Inventor
Norman W. Knight.
By H. L. Woodward
Attorney

UNITED STATES PATENT OFFICE.

NORMAN W. KNIGHT, OF SPANGLE, WASHINGTON.

COMBINED PARACHUTE AND HELICOPTER.

1,021,784. Specification of Letters Patent. Patented Apr. 2, 1912.

Application filed June 21, 1911. Serial No. 634,514.

*To all whom it may concern:*

Be it known that I, NORMAN W. KNIGHT, a citizen of the United States, residing at Spangle, in the State of Washington, have invented new and useful Improvements in Combined Parachutes and Helicopters, of which the following is a specification.

This invention relates to aerial navigating craft, and more particularly to helicopters and has for its object to provide means for increasing the safety of such devices.

The principal aim of the invention is to provide an efficient construction of helicopter with means adapting it to be used as a parachute in case of necessity.

A most important object is to provide means thereon which will operate automatically in the event of an accident to the machinery to prevent falling of the craft to the earth too abruptly, and which will be operative at a slight elevation.

Other objects and advantages will be apparent from the following description, and from the drawings, in which, Figure 1 is a side view of the device in ascending position, Fig. 2 is a similar view showing the device operative as a parachute, Fig. 3 is a similar view of a modification.

There is illustrated, in the first figure a portion of an aerocraft, including a motor 10 upon a suitable framework 11, projecting upwardly from which is the driving shaft 12 connected in any suitable manner with the motor and carrying a helicopter 14 of any suitable construction. The aerocraft may be provided with any number of helicopters, as will be readily understood, disposed at proper points to exert a balanced "lift" or one large helicopter may be used centrally of the machine. Any suitable means may be used for the forward motion of the craft, as may be found most expedient.

The helicopter 14 consists of two sets of spirally convoluted planes or webs, making preferably about three turns, although more or less may be used if found desirable. For support of the webs peculiarly shaped cross bars 16 are secured at their central portions to the shaft 12, having their opposite end portions inclined downwardly, and the ends curved downwardly as at 17, these rods being disposed at proper intervals, and the webs stretched thereover with suitable connecting stays and other reinforcements usually employed in the art. By this construction a minimum weight may be employed. It will be noticed that the necessity for heavy bracing is obviated, and by the downward curving of the bars, and their inclination, as shown, a bell-like formation of the web in transverse section is presented, whereby a maximum efficiency from the air engaged is attained. The bar at the upper transverse edge of the helicopter may be held against escape laterally from the device, and a continuous lifting effect from the air compressed therein will be exerted until it escapes from the lower end.

At a point adjacent the upper end, a plurality of pivoted vanes or valve devices 20 are incorporated, each comprising a suitable frame 21 corresponding in shape to the cross sectional contour of the space between two adjacent convolutions on one side of the device, the frame being hinged at one edge to the uppermost convolution, as at 23. These frames are covered with a suitable webbing, 25 and are inclined toward the lower portion of the helicopter, a suitable side webbing 26 being attached to the lateral edges and connected to the under side of the same web to which the frame is attached, the side webs being triangular in shape and adapted to fold inward to allow the plane 23 to swing upwardly into close relation to the supporting convolution, so that the plane 23 will form as nearly as possible a continuation of the adjacent surface of the web 15. If desired, some resilient means may be incorporated between the plane 23 and the supporting web, whereby it will be forced outward slightly, to facilitate its operation for the purpose which will now be described.

When the device is operated by evolute rotation,—that is—in a clockwise direction, the engagement of air against the under side of the planes 23 will not force them upwardly against the supporting web, until the pressure thus developed reaches a predetermined stage, the resilient means before mentioned being so proportioned in strength as to force these vanes outwardly until that efficiency of lift is attained. When the air craft has been raised to a height, if anything should affect the motor so that its speed of operation is nearly or quite checked, it will be appreciated that notwithstanding the rotation of the helicopter at a certain speed, the craft would nevertheless begin to descend. If the rotary movement were very slow, it would not be sufficient to move air downward while the craft sinks, and as when rotation ceases an upward movement of air between the convolutions of the helicopter would occur, and by having the resilient devices engaged with the frames 23 adjusted to the proper tension they will engage the upwardly moving air, the effect of which will be to produce a lifting force within the helicopter, staying the fall of the machine to a considerable extent and making it possible for it to descend without much damage.

Any number of the valve planes 23 may be incorporated in the device, as will be readily understood.

What is claimed is:—

1. In a device of the class described a convoluted web, a webbed frame member pivoted to the under side thereof adjacent its upper portion, and inclined toward its lower portion normally and adapted to be moved upwardly into close proximity with the convoluted web by engagement with air under normal operation, and being adapted to fall and resist upward passage of air through the device, under casual circumstances as described.

2. In a device of the class described the combination with a convoluted web of a web member pivoted to the under side of the first named web at its upper portion and inclined toward its lower portion, its pivotal axis being disposed radially with respect to the axis of the convolutions of the first named web, and folding web portions at opposite sides of the second named web member coengaged therewith and with the first named web member to prevent lateral escape of air between said web members under casual operation, as described.

In testimony whereof I have hereunto set my hand in presence of two subscribing witnesses.

NORMAN W. KNIGHT.

Witnesses:
W. G. ELLEDGE,
O. W. NEWLON.

Copies of this patent may be obtained for five cents each, by addressing the "Commissioner of Patents, Washington, D. C."